(12) United States Patent
Couillaud et al.

(10) Patent No.: US 6,649,903 B2
(45) Date of Patent: Nov. 18, 2003

(54) SELF-CONFIGURABLE OPTICAL PROXIMITY DETECTOR

(75) Inventors: Frédéric Couillaud, Angouleme (FR); Alain Guillot, Fleac (FR); Jean-Pierre Laurent, Marillac le Franc (FR)

(73) Assignee: Schneider Electric Industries SA (FR)

( * ) Notice: Subject to any disclaimer, the term of this patent is extended or adjusted under 35 U.S.C. 154(b) by 112 days.

(21) Appl. No.: 09/995,744

(22) Filed: Nov. 29, 2001

(65) Prior Publication Data
US 2002/0066854 A1 Jun. 6, 2002

(30) Foreign Application Priority Data
Dec. 6, 2000 (FR) .............................. 00 15944

(51) Int. Cl.$^7$ ............................................... H01J 40/14
(52) U.S. Cl. .................................... 250/221; 250/214 R
(58) Field of Search .............................. 250/221, 214 R, 250/222.1, 223 R, 201.1, 551; 340/555–557, 507; 356/621, 622, 638

(56) References Cited

U.S. PATENT DOCUMENTS

| 4,879,461 A | | 11/1989 | Philipp ........................ 250/221 |
| 5,103,085 A | * | 4/1992 | Zimmerman ................. 250/221 |
| 5,541,403 A | | 7/1996 | Heinonen et al. ........... 250/221 |
| 6,157,024 A | | 12/2000 | Chapdelaine et al. ....... 250/221 |

FOREIGN PATENT DOCUMENTS

| EP | 0 923 140 | 6/1999 |
| FR | 2 792 732 | 10/2000 |

* cited by examiner

Primary Examiner—Que T. Le
(74) Attorney, Agent, or Firm—Parkhurst & Wendel, L.L.P.

(57) ABSTRACT

Optical detector capable of operating in proximity mode or in proximity with background elimination mode, including an emission system and a reception system having hardware and software detection and configuration means capable of recognizing the appropriate mode by measuring the distance of the background, comparing a reception signal with at least one threshold, and automatically switching the reception system into proximity mode or proximity with background elimination mode depending on the result of the comparison.

6 Claims, 2 Drawing Sheets

SELF-CONFIGURABLE OPTICAL PROXIMITY DETECTOR

FIELD OF THE INVENTION

This invention relates to an optical detector that has the property of being self-configurable, so that it can operate in proximity mode or in proximity with background elimination mode, this type of detector comprising an emission system and a reception system, the reception system being provided with at least one photoreceptor component capable of outputting a reception signal meaningful of whether an object is present on the path of an emission beam, or its distance along the path of an emission beam.

BACKGROUND OF THE INVENTION

It is known that optical detectors emitting a light beam and using diffuse light reflection on the object to be detected use either energy measurement in a "proximity" family, or a measurement of the displacement of the light spot received by the photoreceptor component, by the triangulation effect, in a "proximity with background elimination" family.

In practice, it would be desirable if this type of detector could automatically determine whether or not it could operate in proximity mode or in proximity with background elimination mode, depending on the distance to the observed background.

The purpose of the invention is to satisfy these needs.

SUMMARY OF THE INVENTION

According to the invention, the first operating mode is proximity mode and the second operating mode is proximity with background elimination mode, and the detector comprises hardware and software means for detection and configuration capable of recognizing the appropriate mode by comparing the reception signal with at least one threshold to measure the distance to the background, and to automatically switch the reception system into a proximity state or a proximity with background elimination state depending on the result of the comparison.

The reception system is automatically switched into one of the two states by a validation means.

BRIEF DESCRIPTION OF THE DRAWINGS

The following description of a non-limitative embodiment of the invention is given with reference to the attached drawings.

DESCRIPTION OF THE INVENTION

Figure 1:
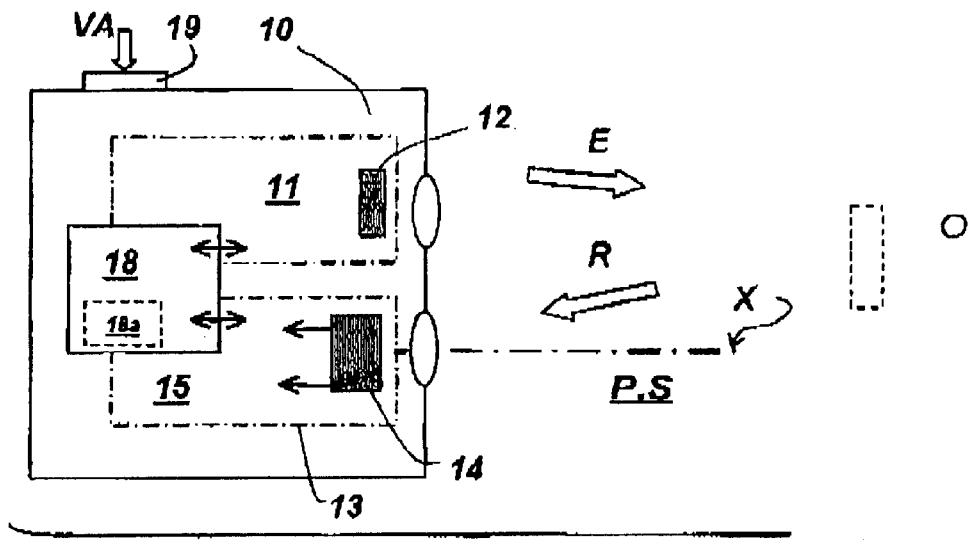
FIG. 1 diagrammatically shows an optical detector according to the invention and the various ways in which it can be used.

The two-mode optical detector in FIG. 1 comprises an emission system 10 provided with an electronic circuit 11, the associated software means and a light emitting device 12 to emit an emission beam E. It also comprises a reception system 13 provided with a photoreceptor device 14 with axis X, an electronic processing circuit 15 and the associated software means, in order to process a reception beam R.

The reception system 13 uses diffuse reflection of light on the object and it is laid out so that it is activated in state 13P in "proximity" mode P or state 13S in "proximity with background elimination" mode S. The object O reflects a beam R that produces a light spot on the component. In proximity mode P, the electronic circuit 15 processes the variation of the intensity of the spot to detect the object. In proximity with background elimination mode S, the detector uses the inclination of the reflected beam in triangulation and the circuit 15 uses the variation in the position of the spot on the photoreceptor device 14.

Figure 2:
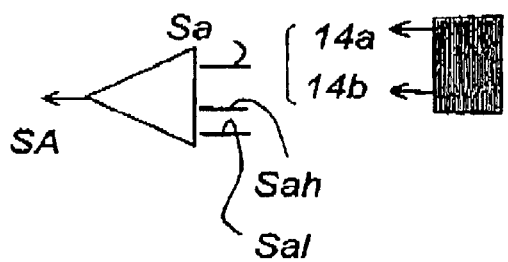
FIG. 2 diagrammatically shows a photo detector component used in the detector in FIG. 1.

An example of a photoreceptor component 14 is shown in FIG. 2. For example, this shows two output channels and it may be a PSD (position sensing device) component or any other similar component for which the outputs 14a and 14b are used to create the reception signal Sa. Note that a PSD component operates with amplification of its output magnitudes and comparison of amplified magnitudes.

The detector comprises hardware and software detection and configuration means 18 that are associated particularly with the reception system and that comprise a microcontroller or any other logical device capable of processing and evaluating the reception signal Sa and generating the signal SA. The reception signal Sa is thus compared with a high threshold Sah and a low threshold Sal to generate the signal SA that identifies which mode is recognized. The reception system and the microcontroller are switched to a state corresponding to proximity mode P or proximity with background elimination mode S, depending on the state of signal SA.

Figure 3:
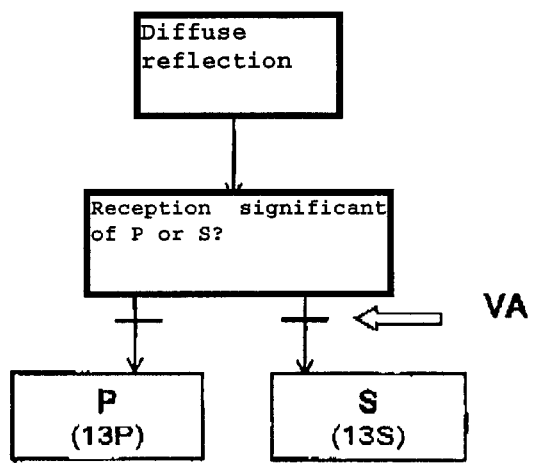
FIG. 3 diagrammatically shows a diagram illustrating the process according to the invention.

FIG. 3 briefly describes self-determination of the optical detector in P mode or in S mode. The detector emission system 10 is implemented and the detection and configuration means 18 of the reception system 13 detect if the reception is significant of P mode or S mode in the presence of a background, by measuring the background distance, comparing this measurement with thresholds Sax, or more precisely with a high threshold Sah and a low threshold Sal, and automatically configuring the reception system in state 13P or 13S depending on the result of the comparison. In practice, if the background distance is within a predetermined interval (for example between 30 cm and 130 cm), the reception system 13 is configured in proximity with background elimination state 13S (position processing), and if the background distance is outside this interval, the reception system is configured in the proximity state 13P (energy processing).

A recognized mode validation action VA is then done. This action may use a timing means 18a (see dashed lines in FIG. 1); it is preferably exerted by the operator using a pusher 19 or other dialog device (in solid lines in FIG. 1). The reception system is automatically configured in state 13P or 13S if there is no validation action.

Figure 4:
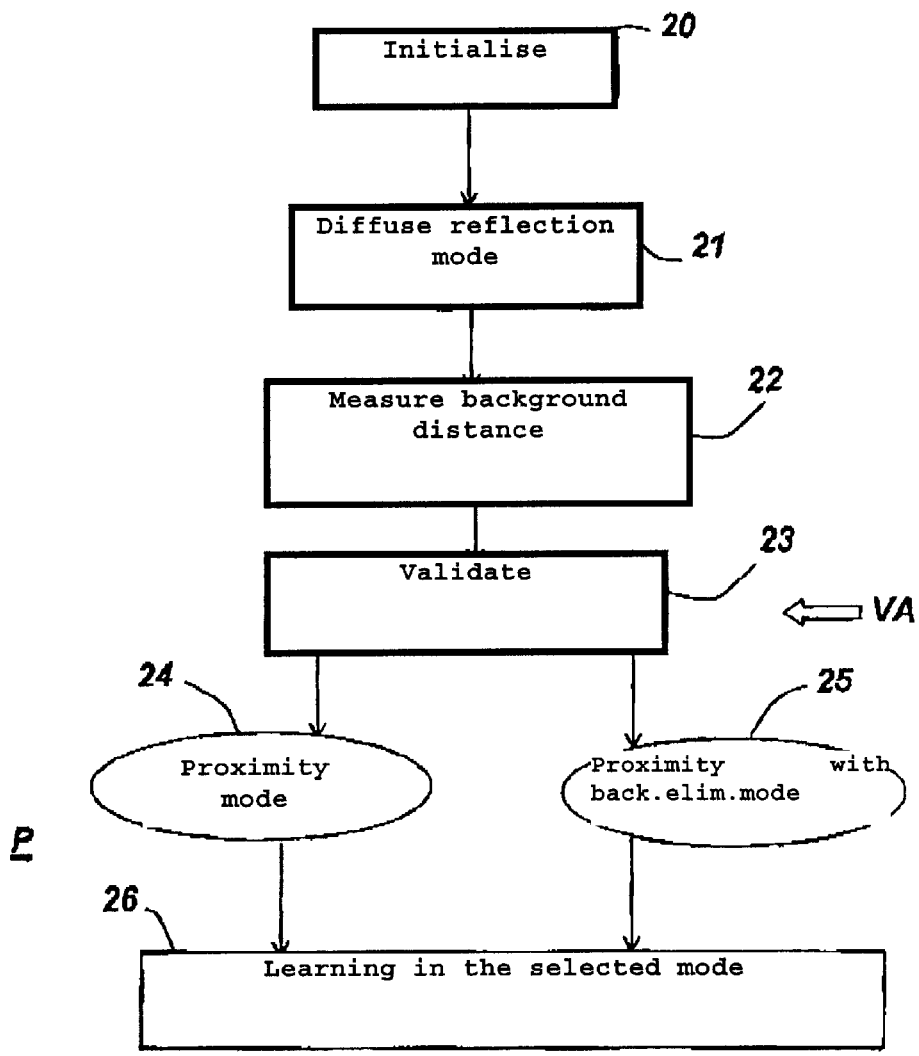
FIG. 4 is an organization chart illustrating the sequence for the detector implementation process.

FIG. 4 shows more details of an example configuration sequence followed by the detector. During initialisation 20 that occurs when the detector is installed or when a user does a reset, the detector enters an emission phase 21 adapted to diffuse reflection. The reception system 13 makes a measurement of the background distance at 22. Depending on the result of the measurement, the detector switches as has already been seen after a validation phase 23 in proximity mode 24 (the reception system 13 is then put into state 13P requiring the use of means of processing the received energy relative to a given threshold), or in proximity with background elimination mode 25 (the reception system 13 is then put into state 13S requiring the use of means of processing the position of the light spot on the photoreceptor component). When the detector does not comprise a validation phase 23, the system 13 changes to state 13P or 13S automatically. When the configuration has been done, the detector starts a learning step 26 that learns the background, and is operational at the end of this step.

What is claimed is:

1. An optical detector comprising a system for emitting an emission beam and a reception system, the reception system comprising at least one photoreceptor component for outputting a reception signal indicating whether an object is on a path of the emission beam or a distance of such object along the beam path, and configurable for activation either in a first operating mode or in a second operating mode, wherein the first operating mode is a proximity mode and the second operating mode is proximity with background elimination mode, and the detector comprises hardware and software means for detection and configuration for recognizing an appropriate operating mode by comparing the reception signal with at least one threshold to measure a background distance and to switch the reception system to a proximity state or a proximity with background elimination state depending on a result of the comparison.

2. The detector according to claim 1, wherein the detection and configuration means comprise means for validating the recognized operating mode.

3. The detector according to claim 1, wherein the detection and configuration means automatically switch the reception system into the proximity state or the proximity with background elimination state after the operating mode has been recognized.

4. The detector according to claim 2, wherein the validation means comprises a dialog device for use by an operator.

5. The detector according to claim 1, wherein the detection and configuration means switch between active areas of the at least one photoreceptor component depending on the state of a signal output from the comparison.

6. The detector according to claim 1, wherein the detection and configuration means switch between output channels of the at least one photoreceptor component, depending on the state of a signal output from the comparison.

* * * * *